United States Patent Office 2,919,486
Patented Jan. 5, 1960

2,919,486

PROCESS FOR MANUFACTURING PISTON RINGS

Alberto Lagradere Banquarel, Barcelona, Spain, assignor to Metales y Plateria Ribera, S.A., Barcelona, Spain No Drawing. Application November 1, 1954
Serial No. 466,195

Claims priority, application Spain November 4, 1953

1 Claim. (Cl. 29—156.6)

The present invention relates to a novel process for manufacturing piston rings for internal combustion engines, compressors, pumps, and the like, that permits the obtaining of piston rings of very superior qualities over those which are obtained by conventional methods.

The piston rings are made from two classes of material, the inner part being of cast iron, and the outer part being of an anti-friction metal of high melting point, such as bronze, copper, lead copper or the like, for sliding over the walls of the cylinders. In this way, each of the said materials imparts to the ring its own characteristics, the result being very much superior to that of conventional rings, in which one single material serves both for providing the spring action and as the sliding surface.

The piston rings obtained in accordance with the present invention are formed by a juxtaposition of two rings united together forming one body, or simply fitted together, that is to say, an inner ring of cast iron and an outer ring of anti-friction metal. It will be understood that, if desired, the inner surface of the ring, may also be provided with a coat of anti-friction metal.

According to the present invention a process for manufacturing such rings comprises the steps of making a ring of cast iron in a mould, machining the outer surfaces of the same as required, applying to the rings so obtained, either individually or stacked into a cylindrical pile, a coat of the required thickness of the anti-friction metal, heat treating the composite rings in a furnace of controlled temperature and atmosphere, machining and/or grinding and cutting them, if necessary, and, finally, verifying and grinding their circumference.

The anti-friction metal may be applied, for instance, by projection of pulverized material, starting from wires, rods or powders using one or more metal spraying pistols, or by a powder metallurgy method.

The heat treatment effects a homogenization of the metals.

For assuring the union of the two metals, there may be provided grooves in the periphery of the iron rings, preferably dovetailed grooves, which, on being filled by the anti-friction metal that constitutes the coating or outer ring, establish a firm connection.

The invention also extends to piston rings made by the said process.

What I claim is:

A process for manufacturing piston rings of two metals, cast iron for providing spring action and mechanical resistance, and anti-friction metal for the sliding surface, comprising the steps of making a ring of cast iron in a mould, machining the outer surfaces of the same, spraying onto the outer periphery of the rings so obtained pulverized high melting anti-friction metal in an amount forming an outer ring resistant to operating conditions, heat treating the composite rings in a furnace of controlled temperature in a reducing atmosphere, and verifying and grinding their circumference.

References Cited in the file of this patent

UNITED STATES PATENTS

| | | |
|---|---|---|
| 1,449,615 | McLeod | Mar. 27, 1923 |
| 2,014,440 | Lee | Sept. 17, 1935 |
| 2,119,035 | Ballard | May 31, 1938 |
| 2,337,588 | Calkins | Dec. 28, 1943 |
| 2,607,983 | McBride | Aug. 26, 1952 |